United States Patent
El-Naas

(10) Patent No.: US 10,118,843 B2
(45) Date of Patent: Nov. 6, 2018

(54) PROCESS FOR CAPTURE OF CARBON DIOXIDE AND DESALINATION

(71) Applicants: UNITED ARAB EMIRATES UNIVERSITY, Al-Ain (AE); ABU DHABI OIL REFINING COMPANY (TAKREER), Abu Dhabi (AE)

(72) Inventor: Muftah El-Naas, Al-Ain (AE)

(73) Assignees: UNITED ARAB EMIRATES UNIVERSITY (AE); ABU DHABI OIL REFINING COMPANY (TAKREER) (AE)

( * ) Notice: Subject to any disclaimer, the term of this patent is extended or adjusted under 35 U.S.C. 154(b) by 348 days.

(21) Appl. No.: 14/829,429

(22) Filed: Aug. 18, 2015

(65) Prior Publication Data
US 2017/0050871 A1 Feb. 23, 2017

(51) Int. Cl.
*B01D 53/14* (2006.01)
*B01F 3/04* (2006.01)
(Continued)

(52) U.S. Cl.
CPC ............ *C02F 1/70* (2013.01); *B01D 53/1475* (2013.01); *B01D 53/62* (2013.01); *B01D 53/77* (2013.01); *B01F 3/04106* (2013.01); *C01D 7/00* (2013.01); *C01F 11/24* (2013.01); *C02F 1/00* (2013.01); *B01D 2251/304* (2013.01);
(Continued)

(58) Field of Classification Search
CPC ........ B01D 2251/304; B01D 2251/404; B01D 2252/10; B01D 53/1475; B01D 53/62; B01D 53/77; B01F 2215/0052; B01F 3/04106; C01D 7/00; C02F 1/00;
(Continued)

(56) References Cited

U.S. PATENT DOCUMENTS 685,810 A  11/1901 Worns
1,138,202 A  5/1915 Erlwein et al.
(Continued)

FOREIGN PATENT DOCUMENTS

CN  201482399  5/2010
CN  101991995  3/2011
(Continued)

OTHER PUBLICATIONS

Machine translation of description of WO-2012/113958 accessed on Nov. 27, 2017 (Year: 2017).*

(Continued)

*Primary Examiner* — Cabrena Holecek
(74) *Attorney, Agent, or Firm* — Foley & Lardner LLP

(57) ABSTRACT

The present invention relates to a process for reducing in a gas stream the concentration of carbon dioxide and for reducing in an aqueous stream the concentration of sodium chloride, which process comprises contacting a feed gas comprising greater than or equal to 0.1% by volume carbon dioxide with an aqueous feed comprising:
(a) sodium chloride; and
(b) calcium oxide and/or calcium hydroxide at a total concentration of greater than or equal to 0.5% by weight, wherein the pH of the aqueous feed is greater than or equal to 10.0. A product aqueous stream obtained from the process of the invention is also described.

18 Claims, 2 Drawing Sheets

(51) Int. Cl.
  *C02F 1/70* (2006.01)
  *B01D 53/62* (2006.01)
  *B01D 53/77* (2006.01)
  *C02F 1/00* (2006.01)
  *C01D 7/00* (2006.01)
  *C01F 11/24* (2006.01)
  *C02F 101/10* (2006.01)

(52) U.S. Cl.
  CPC .... B01D 2251/404 (2013.01); B01D 2252/10 (2013.01); B01F 2215/0052 (2013.01); C02F 2101/10 (2013.01); Y02C 10/04 (2013.01); Y02C 10/06 (2013.01)

(58) Field of Classification Search
  CPC ........ C02F 1/70; C02F 2101/10; Y02C 10/04; Y02C 10/06
  See application file for complete search history.

(56) References Cited

U.S. PATENT DOCUMENTS

| | | | |
|---|---|---|---|
| 2,015,347 | A | 9/1935 | Luther |
| 3,219,324 | A | 11/1965 | Williams et al. |
| 3,350,075 | A | 10/1967 | Douglas |
| 3,733,061 | A | 5/1973 | Bockman |
| 3,801,474 | A | 4/1974 | Castellucci |
| 3,809,240 | A | 5/1974 | Savall |
| 3,905,900 | A | 9/1975 | Gulyas et al. |
| 4,130,365 | A | 12/1978 | Sittig |
| 4,168,913 | A | 9/1979 | Kono |
| 4,533,367 | A | 8/1985 | Hadzismajlovic |
| 5,288,472 | A * | 2/1994 | Ruiz ........................ C01D 7/07 205/480 |
| 5,928,620 | A | 7/1999 | Lynn |
| 6,123,324 | A | 9/2000 | Swan et al. |
| 6,631,890 | B1 | 10/2003 | Lau |
| 7,637,485 | B2 | 12/2009 | Honnell |
| 7,931,809 | B2 | 4/2011 | Constantz et al. |
| 2010/0150803 | A1 | 6/2010 | Lin |
| 2010/0154679 | A1 | 6/2010 | Constantz et al. |
| 2011/0064634 | A1 | 3/2011 | Enos et al. |
| 2011/0168059 | A1 | 7/2011 | Murray et al. |
| 2011/0198081 | A1* | 8/2011 | Pone ..................... E21B 43/164 166/270.1 |
| 2014/0260310 | A1* | 9/2014 | Berlowitz ................ C01B 3/34 60/780 |
| 2015/0191385 | A1 | 7/2015 | Lee et al. |
| 2016/0222774 | A1* | 8/2016 | Rhodes .................. B01D 53/62 |

FOREIGN PATENT DOCUMENTS

| | | |
|---|---|---|
| CN | 101875000 A | 7/2012 |
| CN | 103861444 | 10/2015 |
| EP | 1 217 061 A1 | 6/2002 |
| FR | 2998811 | 6/2014 |
| GB | 2 027 607 | 2/1980 |
| WO | WO-2007/139392 A1 | 12/2007 |
| WO | WO-2011/102868 | 8/2011 |
| WO | WO-2012/085552 | 6/2012 |
| WO | WO-2012/113958 A1 | 8/2012 |
| WO | WO -2012113958 A1 * | 8/2012 ............. B01D 53/62 |
| WO | WO-2014/125269 | 8/2014 |
| WO | WO-2014/177857 | 11/2014 |

OTHER PUBLICATIONS

Machine translation of claims of WO-2012/113958 accessed on Nov. 28, 2017 (Year: 2017).*

Chang et al., "Mass transfer in two-and three-phase fluidized beds," J Chem Eng Japan, 1986, pp. 524-530, vol. 19, No. 6, The Society of Chemical Engineers, Japan, Tokyo.

International Search Report and Written Opinion for PCT/GB2016/052560 dated Nov. 8, 2016.

International Search Report and Written Opinion for PCT/GB2016/052561 dated Jan. 2, 2017.

U.S. Office Action on US 14/829419 dated Sep. 30, 2016.

Notice of Allowance on U.S. Appl. No. 14/829,419 dated Apr. 3, 2017.

* cited by examiner

PROCESS FOR CAPTURE OF CARBON DIOXIDE AND DESALINATION

FIELD OF THE INVENTION

The present invention relates to a process for reducing in a gas stream the concentration of carbon dioxide and for reducing in an aqueous stream the concentration of sodium chloride. Also described is a product aqueous stream obtained from the process, and the use of calcium hydroxide and/or calcium oxide in the process.

BACKGROUND OF THE INVENTION

Carbon dioxide is a major contributor to global warming, which is one of the most serious environmental problems facing society. Carbon dioxide is believed to have the greatest adverse impact on the observed greenhouse effect causing approximately 55% of global warming. Relying on fossil fuels as the main source of energy in many parts of the world has contributed to the rise of carbon dioxide emissions to unprecedented levels. Many industries, for instance natural gas sweetening, hydrogen production for ammonia and ethylene oxide, oil refining, iron and steel production, desalination, energy production, and cement and limestone manufacturing, represent major sources of carbon dioxide emissions.

Carbon capture and storage (CCS) is an option to reduce carbon dioxide emissions. CCS is based on the separation and capture of carbon dioxide produced by fossil fuel power plants and other sources either before or after combustion. A number of $CO_2$ capture technologies have been used such as oxy-fuel combustion, pre-combustion decarbonization, post-combustion processing and chemical looping combustion. Among the post-combustion capture techniques, the most promising and most effective are solvent absorption, adsorption using solid sorbents, membrane separation, and cryogenic fractionation technology.

Key parameters for selecting an effective solvent for $CO_2$ absorption include high absorption, fast reaction kinetics, low degradation rate, and low regeneration energy as well as the ability to handle large amounts of exhaust streams.

U.S. Pat. No. 8,540,954 proposes the use of molten salts as an absorption medium, wherein the absorption medium comprises molten salts containing at least one halide of an alkali or alkali earth metal that has a content of dissolved metal oxide, which reacts with the carbon dioxide and creates a metal carbonate. The molten salts, which contain a metal carbonate, are heated at temperatures of 600 to 1600° C. to release the metal oxide and carbon dioxide. However, the main disadvantage of applying chemical absorption process is the thermal energy requirement for separating the $CO_2$ from the solvent.

EP2529825 describes the use of carbonate looping technology where flue gas is made in contact with solid material to capture and store $CO_2$, which can then be released by decarbonation at elevated temperatures.

WO 2012/120173 describes the capture of $CO_2$ in a tube exchanger with amino-alcohol-impregnated alumina supports under combined conditions of TSA, PSA, vapour entrainment and subsequent reconditioning of the sorbent.

JP2012091130 describes a $CO_2$ recovery device which can recover $CO_2$ from exhaust gas by using an amine liquid with high efficiency.

U.S. Pat. No. 8,647,412 describes the use of a sorbent material derived from an amino-functionalized alkoxysilane and a polyamine, wherein the sorbent material is present in an amount equal to or greater than 10 g/l, wherein at least some of the sorbent material resides in the porous channel walls and forms $CO_2$ adsorption sites within the interior of the porous channel walls. However, amine-based sorbents are known to require costly feed materials and need significant amounts of solvents through the preparation processes (Fuel 108 (2013) 112-130).

US20110005390 describes the use of solid particles made of a cross-bounded, highly porous polymer substrate and $CO_2$ absorbing functional nucleophilic groups grafted on the particle surface. Other methods of making these structures for $CO_2$ capture are described in US20070149398 as a high surface area structure that includes a plurality of pores in the high surface area structure. The $CO_2$ sorption structure is an inorganic/organic hybrid structure that is about 10 to 70% organic and about 30 to 90% inorganic.

A device and method for capturing $CO_2$ from fluid flow is described in U.S. Pat. No. 8,211,394. It includes a flow-through apparatus and a $CO_2$-absorbing filter treated with an alkaline material which is housed within the flow-through apparatus. The flow-through apparatus receives fluid flow and the $CO_2$ is absorbed by the $CO_2$-absorbing filter. The absorbed $CO_2$ is then converted into $CaCO_3$ which is combined with volcanic ash to form a useful cement material. US20100218507 describes a system for removing $CO_2$ from the environment using four major steps: capture, separation, transformation, and sequestration.

The Solvay process has been considered for the capture of $CO_2$ and the production of useful and reusable carbonate products, as well as the desalination of saline water (Desalination 251 (2010) 70-74). Solvay is a process for the manufacture of sodium carbonate (soda ash), where ammonia and carbon dioxide are passed through a saturated sodium chloride solution to form soluble ammonium chloride and a precipitate of sodium bicarbonate according to Reaction (1) below. The sodium bicarbonate is heated to form the washing soda and the ammonium chloride solution is reacted with calcium hydroxide to recover the ammonia according to Reactions (2) and (3), respectively.

$$NaCl + NH_3 + CO_2 + H_2O \rightarrow NaHCO_3 + NH_4Cl \quad (1)$$

$$2NaHCO_3 \rightarrow Na_2CO_3 + CO_2 + H_2O \quad (2)$$

$$2NH_4Cl + Ca(OH)_2 \rightarrow CaCl_2 + 2NH_3 + 2H_2O \quad (3)$$

Many methods have applied the Solvay approach. WO 2007/139392 describes a combined process for removing carbon dioxide from combustion gases and desalination of water by reaction of carbon dioxide of the input gas stream with an alkaline solution based on ammonia and saline water. A similar process is described in U.S. Pat. No. 7,309,440, which involves the desalination of seawater and separation of $CO_2$ from a gas turbine exhaust; seawater is mixed with $NH_4OH$ and released via a series of nozzles in several vertical levels in a process unit.

EP1961479 describes a process where $CO_2$ is contacted with concentrated brine and ammonia. Such an approach is also described in U.S. Pat. No. 8,486,182 where ammonia is mixed with seawater to produce ammonia-saturated seawater which is then contacted with an exhaust gas so that carbon dioxide in the exhaust gas is absorbed in the ammonia-saturated seawater.

Another method for combining the desalination of seawater and the removal of $CO_2$ is described in WO 2001/096243, where seawater is mixed with ammonia and then pumped into a chamber and dispersed at many points near the top as a fine spray, exposing the salt to the $CO_2$ gas. WO 2010/057261 describes a process for producing soda ash from brine waste. The process involves reacting brine waste with carbon dioxide and ammonia to produce soda ash, wherein at least a portion of the ammonia is regenerated from ammonium chloride produced during the reaction. The regeneration is achieved through the use of a weak base anion exchange resin. US 2012/0298522 also describes a system and method for soda ash production, but by integrating the Solvay process with an electrochemical process to produce a less $CO_2$-intensive Solvay process and an environmentally friendly sodium carbonate product. Desalination methods that include carbonate compound precipitation are described in U.S. Pat. No. 7,931,809 where both feed water and waste brine are subjected to carbonate compound precipitation conditions and carbon dioxide sequestration.

One of the major drawbacks of the Solvay process as used in the above mentioned documents is the presence of ammonia, which is considered an environmental and health hazard. At room temperature, ammonia is a colourless, highly irritating gas with a pungent, suffocating odour. It is highly corrosive and hydroscopic. Although ammonia gas is not flammable outside its explosion limits (16 to 25%), containers of ammonia may explode when exposed to high temperatures. Exposure to high concentrations of ammonia can cause severe injuries such as burning of the skin, nose, throat and respiratory tract, which can cause bronchiolar and alveolar oedema, and airway destruction leading to respiratory distress or failure. Ammonia is not involved in the overall Solvay reaction, but it plays a key role in buffering the solution at a basic pH; without ammonia, the acidic nature of the water solution will hinder the precipitation of sodium bicarbonate (Desalination 251 (2010) 70-74).

It is therefore desirable to find a process for desalinating water and capturing $CO_2$ which does not require the use of ammonia. It is also desirable to develop a process which does not make use of energy intensive steps such as electrolysis.

SUMMARY OF THE INVENTION

The present inventors have developed a modified Solvay process that does not involve the use of ammonia, and does not require energy intensive steps such as electrolysis. Instead, it has been surprisingly found that calcium oxide and/or calcium hydroxide may be used effectively to raise the pH and capture the $CO_2$ and desalinate water according to Reaction (4):

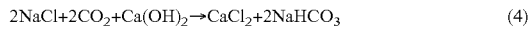

$$2NaCl+2CO_2+Ca(OH)_2 \rightarrow CaCl_2+2NaHCO_3 \quad (4)$$

In addition, the invention eliminates the need for ammonia recovery (Reaction (3) above) which is an energy intensive step in the Solvay process. Both Reactions (4) and (1) are exothermic at 20° C. with ΔH of −208 kJ/kmol and −2.8 kJ/kmol, respectively. The modified Solvay process (Reaction (4) above) is more spontaneous at 20° C. (ΔG of −55.6 kJ/kmol) than the known Solvay process, Reaction (1) (ΔG=−3 kJ/kmol).

The invention therefore provides a process for reducing in a gas stream the concentration of carbon dioxide and for reducing in an aqueous stream the concentration of sodium chloride, which process comprises contacting a feed gas comprising greater than or equal to 0.1% by volume carbon dioxide with an aqueous feed comprising:
(a) sodium chloride; and
(b) calcium oxide and/or calcium hydroxide at a total concentration of greater than or equal to 0.5% by weight,
wherein the pH of the aqueous feed is greater than or equal to 10.0.

The invention further provides a product aqueous stream obtained from a process for reducing in a gas stream the concentration of carbon dioxide and for reducing in an aqueous stream the concentration of sodium chloride, which process comprises
(i) contacting a feed gas comprising greater than or equal to 0.1% by volume carbon dioxide with an aqueous feed comprising:
(a) sodium chloride; and
(b) calcium oxide and/or calcium hydroxide at a total concentration of greater than or equal to 0.5% by weight; and
(ii) recovering said product aqueous stream having a lower concentration of sodium chloride than the aqueous feed;
wherein the pH of the aqueous feed is greater than or equal to 10.0.

The invention also provides use of calcium oxide and/or calcium hydroxide for reducing in a gas stream the concentration of carbon dioxide and for reducing in an aqueous stream the concentration of sodium chloride in a process as defined herein.

DETAILED DESCRIPTION OF THE INVENTION

Figure 1:
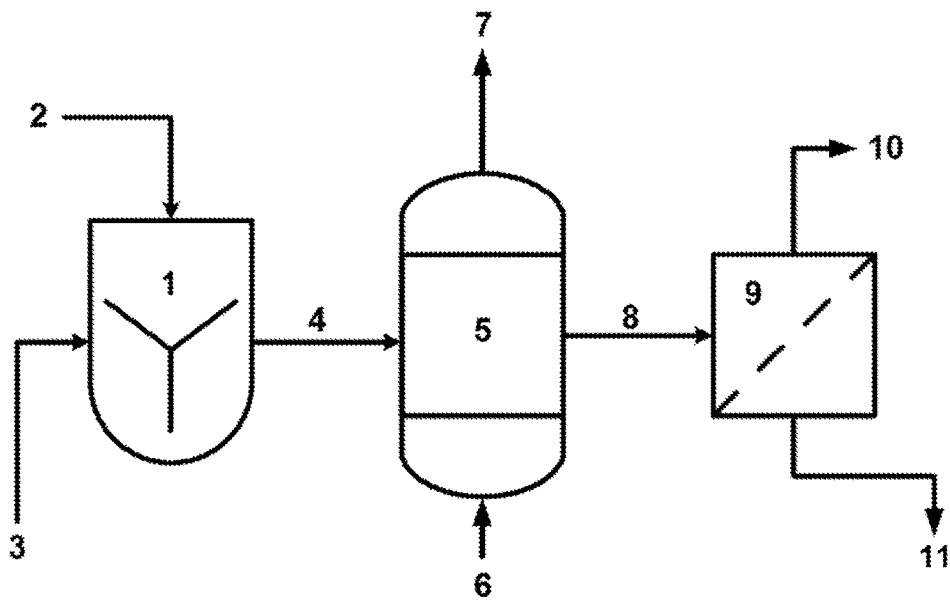
FIG. 1 shows a schematic diagram of the main units of the Modified Solvay process.

FIG. 1 shows a schematic diagram illustrating the Modified Solvay process in one embodiment of the invention. This includes a vessel (1) for mixing CaO and/or $Ca(OH)_2$ (2) with a saline feedstock (3) to produce an aqueous feed (4); a contact reactor (5) for contacting the aqueous feed (4) with $CO_2$-containing gases (6) to produce a gas with a reduced $CO_2$ concentration (7) and a treated aqueous feed (8); and a filter (9) to filter out precipitated sodium bicarbonate (10) and leave a reduced salinity product aqueous stream (11).

In the process of the invention, the pH of the aqueous feed is greater than or equal to 10.0. Typically, the pH of the aqueous feed is greater than or equal to 10.5. Preferably, the pH of the aqueous feed is greater than or equal to 11.0. In some cases, the pH of the aqueous feed may be greater than or equal to 11.5 or greater than or equal to 12.0.

The pH of the aqueous feed as defined herein is typically the pH of the aqueous feed as measured when it contacts the feed gas, e.g. the pH or the aqueous feed when it enters a reactor in which the aqueous feed and feed gas are contacted. The pH may be measured by any suitable method, for instance by using a pH meter or an indicator. The pH is typically as measured at 25° C. Methods of measuring pH are well known to the skilled person. The pH of the aqueous feed typically decreases after contact with the carbon dioxide containing feed gas.

Typically the aqueous feed and feed gas are contacted in a reactor and the pressure inside the reactor is from 0.1 to 10.0 atm (absolute pressure). Preferably the pressure inside the reactor is from 0.9 to 2.0 atm.

The temperature of the aqueous feed when it is contacted with the feed gas is typically from 1° C. to 80° C. Preferably the temperature of the aqueous feed is from 5° C. to 40° C., more preferably from 10° C. to 30° C.

The high pH of the aqueous feed typically results from the presence of the calcium oxide and/or calcium hydroxide. Calcium oxide typically hydrolyses when in solution to form calcium hydroxide. While some calcium hydroxide may be present in the saline feedstock from which the aqueous feed is derived, it is typically necessary to add further calcium hydroxide and/or calcium oxide to achieve the preferred pH.

Preferably therefore, the process further comprises an initial step of adding at least part of the calcium oxide and/or calcium hydroxide to a saline feedstock to produce the aqueous feed. The calcium oxide and/or calcium hydroxide is typically added as a solid or an aqueous solution to the saline feedstock.

The calcium hydroxide and/or calcium oxide may come from any suitable source. For instance, they may be added as substantially pure (e.g. greater 80 wt % purity) compounds, or they may originate from naturally occurring minerals or solid waste. For instance, the calcium hydroxide and/or calcium oxide may be added as solid waste produced in the steelmaking industry or construction industry. Alternatively, the calcium hydroxide and/or calcium oxide may be added as a naturally occurring mineral which contains calcium.

The calcium oxide and/or calcium hydroxide is typically at least partly dissolved in the aqueous feed. The aqueous feed may be heated or agitated to cause dissolution of the calcium hydroxide and/or calcium oxide.

The aqueous feed comprises calcium oxide and/or calcium hydroxide at a total concentration of greater or equal to than 0.2% by weight. The aqueous feed usually comprises calcium oxide and/or calcium hydroxide at a total concentration of greater than or equal to 0.5% by weight. The aqueous feed typically comprises calcium oxide and/or calcium hydroxide at a total concentration of greater than or equal to 1.0% by weight. The aqueous feed preferably comprises calcium oxide and/or calcium hydroxide at a total concentration of from 1.0% to 2.0% by weight. For instance, the aqueous feed may comprises calcium hydroxide at a total concentration of greater than 0.5% by weight, or calcium hydroxide at a total concentration of from 1.0% to 2.0% by weight.

The percentage by weight is relative to the weight of the aqueous stream. Thus, the aqueous stream typically comprises greater than or equal to 2.0 g of calcium hydroxide and/or calcium oxide per 1.0 kg of aqueous feed. More typically, the aqueous stream comprises greater than or equal to 5.0 g of calcium hydroxide and/or calcium oxide per 1.0 kg of aqueous feed. Preferably, the aqueous stream typically comprises from 10.0 to 20.0 g of calcium hydroxide and/or calcium oxide per 1.0 kg of aqueous feed. For instance, the aqueous stream may comprise from 10.0 to 20.0 g of calcium hydroxide per 1.0 kg of aqueous feed.

The concentration of calcium oxide and/or calcium hydroxide is typically the concentration in the aqueous stream when the aqueous stream first contacts the feed gas, i.e. the concentration of the aqueous feed when it enters the reactor in which the aqueous feed and feed gas are contacted.

The molar ratio of (calcium hydroxide):(sodium chloride) in the aqueous feed is typically from 0.05:1.0 to 1.0:1.0, for instance from 0.1:1.0 to 0.7:1.0. The molar ratio of (calcium hydroxide):(sodium chloride) in the aqueous feed is preferably from 0.2:1.0 to 0.6:1.0. The molar ratio of (calcium hydroxide):(sodium chloride) may for instance be from 0.2:1.0 to 0.4:1.0. In some cases, the molar ratio of (calcium hydroxide):(sodium chloride) is most preferably about 0.3:1.0, for instance from 0.25:1.0 to 0.35:1.0.

The process of the invention is suitable for desalinating saline feedstocks having a range of salinities. Typically, the concentration of sodium chloride in the aqueous feed is greater than or equal to 5.0 g/l, for instance greater than or equal to 10.0 g/l. Preferably, the concentration of sodium chloride in the aqueous feed is greater than or equal to 20.0 g/l. For instance, the concentration of sodium chloride in the aqueous feed may be greater than or equal to 60.0 g/l. The concentration of sodium chloride is typically less than or equal to 250.0 g/l.

The process of the invention can sequester carbon dioxide from feed gases comprising carbon dioxide. Typically, the feed gas comprises greater than or equal to 1.0% by volume carbon dioxide, for instance greater than or equal to 3.0% by volume. More typically, the feed gas comprises greater than or equal to 5.0% by volume carbon dioxide. For some feed gases, the concentration of carbon dioxide may be greater than or equal to 7.0% by volume, for instance greater than or equal to 10.0% by volume. The percentage by volume is relative to the volume of the feed gas. Thus, a carbon dioxide concentration in the fee gas of greater than or equal to 5.0% by volume carbon dioxide corresponds to 5 $cm^3$ per 100 $cm^3$ of feed gas.

The concentration of carbon dioxide is typically the concentration in the feed gas when the feed gas first contacts the aqueous, i.e. the concentration of carbon dioxide in the feed gas when the feed gas enters the reactor in which the feed gas and aqueous feed are contacted.

The feed gas may originate from any source, but typically originates from the combustion of a material which comprises carbon. Typically, the feed gas comprises exhaust gas, flue gas, flare gas or natural gas. Exhaust gas, flue gas and flare gas arise from the combustion of hydrocarbons. These terms are well known to the skilled person. Natural gas is a gas which comprises methane and is formed together with other hydrocarbon deposits.

The feed gas typically further comprises nitrogen, oxygen and water vapour. The feed gas may for instance be a feed gas comprising greater than or equal to 65.0% by volume nitrogen, greater than or equal to 5.0% by volume carbon dioxide, greater than or equal to 3.0% by volume water vapour, and greater than or equal to 2.0% by volume oxygen. Often, the feed gas further comprises small volumes of carbon monoxide (e.g. greater than or equal to 10 ppm carbon monoxide), $NO_x$ (e.g. greater than or equal to 100 ppm $NO_x$) and/or sulfur dioxide (e.g. greater than or equal to 100 ppm sulfur dioxide).

Contacting the feed gas with the aqueous feed typically comprises (i) passing the feed gas through the aqueous feed or (ii) agitating the aqueous feed in the presence of the feed gas. Preferably, the feed gas is contacted with the aqueous feed in a reactor. The feed gas is often bubbled through the aqueous feed in a reactor.

Typically, the feed gas is contacted with the aqueous feed in a bubble column reactor.

The reaction between the calcium hydroxide and/or calcium oxide and the carbon dioxide produces sodium bicarbonate. Typically, solid sodium bicarbonate is produced as a result of contacting the feed gas with the aqueous feed. The sodium bicarbonate contains sequestered carbon dioxide and thus production of the sodium bicarbonate leads to reduction of the concentration of carbon dioxide in the feed gas.

The solid sodium bicarbonate produced can be a useful product. Often, the process further comprises recovering said solid sodium bicarbonate. For instance, the solid sodium bicarbonate may be recovered by filtration or sedimentation.

The process may further comprise heating said recovered solid sodium bicarbonate to produce recovered carbon dioxide. The recovered carbon dioxide may then be used in an enhanced oil recovery process.

The process of the invention reduces the salinity of the aqueous feed, and thus may produce a product aqueous stream having a lower concentration of sodium chloride than the aqueous feed. The salinity is reduced by the sodium being removed as sodium bicarbonate. The process of the invention preferably further comprises recovering a product aqueous stream having a lower concentration of sodium chloride than the aqueous feed. The product aqueous may be recovered simply by collecting all of the aqueous material at the end of the process. Alternatively, the product aqueous feed may be produced by performing a further purification step or treatment step on the water.

The product aqueous stream has a lower salinity than the saline feedstock and may be useful in a number of applications. The process of the invention may further comprise using said product aqueous stream for irrigation or low salinity water flooding.

The process of the invention reduces the concentration of carbon dioxide in a feed gas. Typically, the process further comprises recovering a product gas stream having a lower concentration of carbon dioxide than the feed gas. Recovering said product gas stream may comprise simply releasing the product gas stream into the atmosphere. Alternatively, recovering said product gas stream may comprise storing the product gas stream, for instance for further use.

The process of the invention has several advantages as discussed above. In particular, unlike known processes for carbon sequestration or desalination, there is no need for energetically expensive electrochemical steps to take place during desalination and/or carbon dioxide capture.

Typically, the process is not an electrochemical process. An electrochemical process is a process in which a voltage is applied to an aqueous feed to cause electrochemical reduction or oxidation of components in that aqueous feed. This would typically appear prior to contacting of the feed gas with the aqueous feed. Thus, the present process typically does not comprise a step prior to the contacting step wherein a voltage is applied to the aqueous feed. Electrochemical steps may occur after recovery of the product aqueous stream, however, for instance to further purify or desalinate the product aqueous stream.

The process of the invention also removes the need for ammonia, which has the associated problems discussed above. The aqueous feed may comprise less than 0.5% by weight ammonia. Typically, the aqueous feed comprises less than 0.1% by weight ammonia. For instance, the aqueous feed may comprise less than 0.05%, or less than 0.01%, by weight ammonia.

The invention also provides a product aqueous stream obtained, or obtainable from, a process for reducing in a gas stream the concentration of carbon dioxide and for reducing in an aqueous stream the concentration of sodium chloride, which process comprises
(i) contacting a feed gas comprising greater than or equal to 0.1% by volume carbon dioxide with an aqueous feed comprising:
  (a) sodium chloride; and
  (b) calcium oxide and/or calcium hydroxide at a total concentration of greater than or equal to 0.5% by weight; and
(ii) recovering said product aqueous stream having a lower concentration of sodium chloride than the aqueous feed;
  wherein the pH of the aqueous feed is greater than or equal to 10.0.

The process for reducing the concentration of carbon dioxide in a feed gas and for reducing the concentration of sodium chloride in an aqueous feed may be as further defined herein.

The invention also provides the use of calcium oxide and/or calcium hydroxide for reducing in a gas stream the concentration of carbon dioxide and for reducing in an aqueous stream the concentration of sodium chloride in a process as defined herein.

EXAMPLES

Example 1

Both the known Solvay process and the Modified Solvay process according to the invention were evaluated experimentally using desalination reject brine in a bubble column reactor. Experiments were carried out in a stainless steel jacketed, bubble column reactor with an internal diameter of 78 mm and an overall height of 700 mm. The reactor was operated in a semi-batch mode, where the brine was exposed to a continuous flow of carbon dioxide mixture with air at atmospheric pressure and 20° C. The effluent gas from the top of the reactor was passed through a moisture trap and then a $CO_2$ gas analyzer (Model 600 series of Non-Dispersive Infrared NDIR analyzers).

One liter of reject brine having a salinity in the range of from 65,000 to 70,000 mg/l was reacted with stoichiometric and optimum molar ratios of either ammonia (the Solvay process) or calcium oxide and/or calcium hydroxide (the Modified Solvay process). The optimum molar ratio and optimum experimental conditions were determined for each process based on the results of sets of experiments designed through Response Surface Methodology (RSM) and based on previous studies for the Solvay process (Desalination 251 (2010) 70-74). The RSM optimization process was based on three major operating parameters: gas flow rate, reaction temperature, and molar ratio. The optimum temperature was around 20° C. for both processes, but the other parameters were different.

For the Solvay process, the reject brine was mixed with ammonium hydroxide (25% by weight $NH_3$) in the molar ratio of (3 $NH_3$:1 NaCl) for the optimum molar ratio experiment and (1 $NH_3$:1 NaCl) for stoichiometric molar ratio experiment. The optimum molar ratio for the Modified Solvay process was determined to be (0.3 $Ca(OH)_2$: 1 NaCl)

or 16 g $Ca(OH)_2$ per liter; whereas the stoichiometric molar ratio is (0.5 $Ca(OH)_2$:1 NaCl).

A gas mixture of 10% by volume of $CO_2$ in air was bubbled through the reactor content at a flow rate of 1 l/min for the stoichiometric ratio and at flow rates of 1.54 l/min and 0.76 l/min for the optimum conditions for the Solvay process and the Modified Solvay process, respectively. Experiments were carried out for a period of 240 minutes, during which brine samples (15 ml each) were collected every 60 minutes and tested for ions removal using ICP spectrometry.

Figure 2:
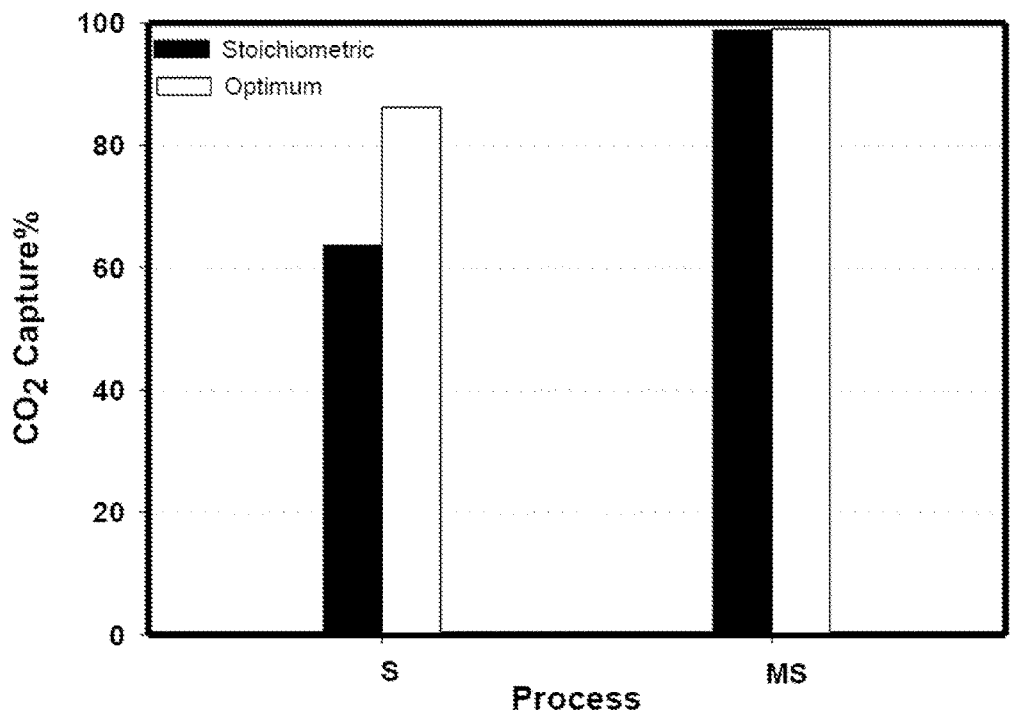
FIG. 2 shows a comparison of $CO_2$ capture efficiency (vertical axis as % $CO_2$ capture) for Solvay (S) and Modified Solvay (MS) processes at stoichiometric (black bars) and optimum (white bars) conditions.
Figure 3:
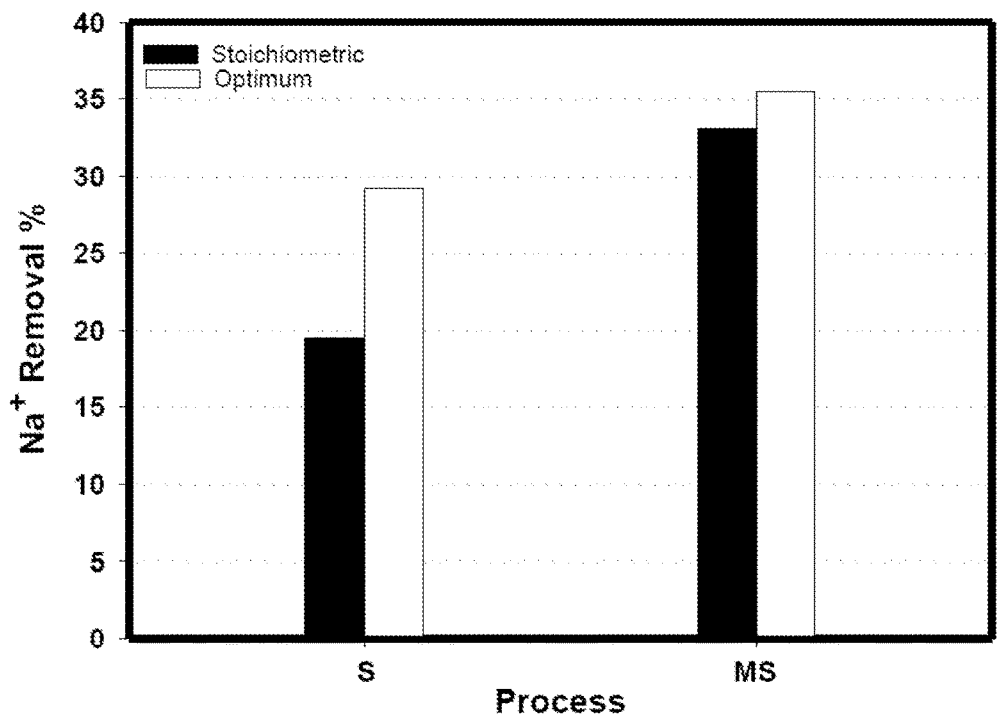
FIG. 3 shows a comparison of sodium removal (vertical axis as % $Na^+$ removal) for Solvay (S) and Modified Solvay (MS) processes at stoichiometric (black bars) and optimum (white bars) conditions.
Figure 4:
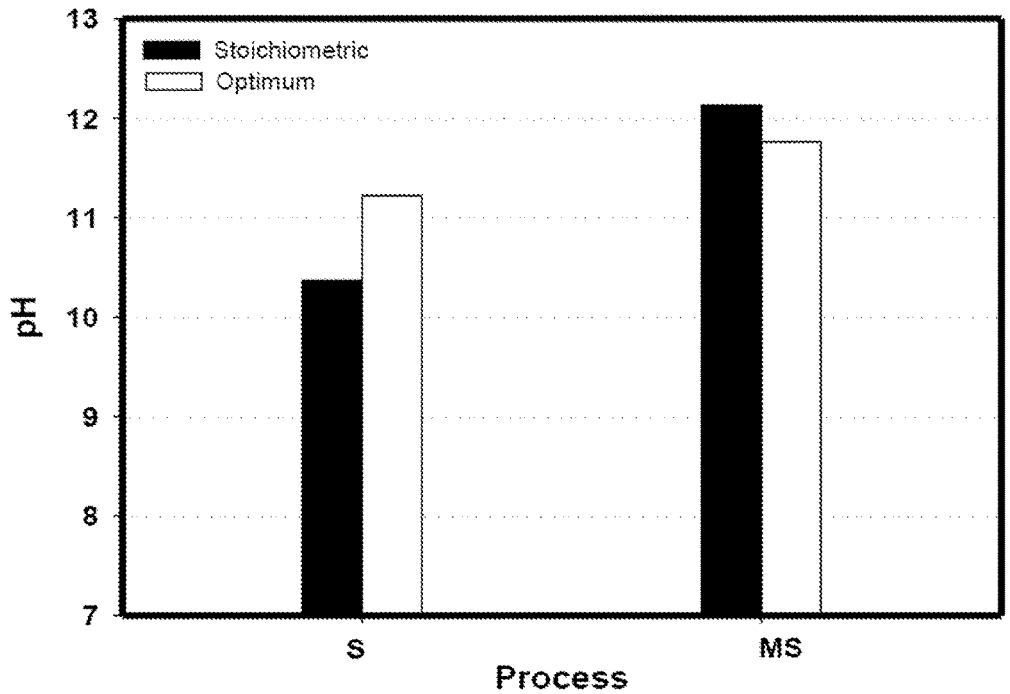
FIG. 4 shows a comparison of solution pH (vertical axis as pH) for Solvay (S) and Modified Solvay (MS) processes at stoichiometric (black bars) and optimum (white bars) conditions.

Comparisons of the experimental results in terms of $CO_2$ removal, ions removal and pH are shown in FIGS. 1 to 3. It is worth noting here that the Stoichiometric experiments were carried out at the same conditions for both processes (20° C., 1 atm, a gas flow rate of 1 l/min); whereas, the optimum conditions experiments were carried out at the specific optimum conditions for each system. FIG. 2 shows a plot of the percent $CO_2$ capture efficiency (moles of $CO_2$ captured per moles of $CO_2$ passed through the system). It is clearly illustrated that the Modified Solvay process is superior in terms of $CO_2$ capture efficiency and sodium removal at both stoichiometric and optimum conditions. It is also apparent that the Modified Solvay process can sustain a higher pH than the Solvay process (FIG. 4) which is the main factor in the reaction process.

The invention claimed is:

1. A process for reducing in a gas stream the concentration of carbon dioxide and for reducing in an aqueous stream the concentration of sodium chloride,
   which process comprises contacting a feed gas comprising greater than or equal to 0.1% by volume carbon dioxide with an aqueous feed comprising:
   (a) sodium chloride; and
   (b) calcium oxide and/or calcium hydroxide at a total concentration of greater than or equal to 0.5% by weight,
   wherein the pH of the aqueous feed is greater than or equal to 10.0.

2. A process according to claim 1, wherein the pH of the aqueous feed is greater than or equal to 11.0.

3. A process according to claim 1, which process further comprises an initial step of adding at least part of the calcium oxide and/or calcium hydroxide to a saline feedstock to produce the aqueous feed.

4. A process according to claim 3, wherein the aqueous feed comprises calcium oxide and/or calcium hydroxide at a total concentration of from 1.0% to 2.0% by weight.

5. A process according to claim 4, wherein the aqueous feed comprises calcium hydroxide at a total concentration of from 1.0% to 2.0% by weight.

6. A process according to claim 1, wherein the molar ratio of (calcium hydroxide):(sodium chloride) in the aqueous feed is from 0.2:1.0 to 0.4:1.0.

7. A process according to claim 1, wherein the concentration of sodium chloride in the aqueous feed is greater than or equal to 20.0 g/l, optionally greater than or equal to 60.0 g/l.

8. A process according to claim 1, wherein the feed gas comprises greater than or equal to 5.0% by volume carbon dioxide.

9. A process according to claim 1, wherein the feed gas comprises exhaust gas, flue gas, flare gas or natural gas.

10. A process according to claim 1, wherein contacting the feed gas with the aqueous feed comprises (i) passing the feed gas through the aqueous feed or (ii) agitating the aqueous feed in the presence of the feed gas.

11. A process according to claim 1, wherein the feed gas is contacted with the aqueous feed in a bubble column reactor.

12. A process according to claim 1, wherein solid sodium bicarbonate is produced as a result of contacting the feed gas with the aqueous feed.

13. A process according to claim 12, which process further comprises recovering said solid sodium bicarbonate, optionally by filtration or sedimentation.

14. A process according to claim 13, which process further comprises heating said recovered solid sodium bicarbonate to produce recovered carbon dioxide.

15. A process according to claim 1, which process further comprises recovering a product aqueous stream having a lower concentration of sodium chloride than the aqueous feed.

16. A process according to claim 1, which process further comprises recovering a product gas stream having a lower concentration of carbon dioxide than the feed gas.

17. A process according to claim 1, which process is not an electrochemical process.

18. A process according to claim 1, wherein the aqueous feed comprises less than 0.1% by weight ammonia.

* * * * *